ns Patent [19]

Fleischer et al.

[11] Patent Number: 4,731,281
[45] Date of Patent: Mar. 15, 1988

[54] PAPERMAKERS FABRIC WITH ENCAPSULATED MONOFILAMENT YARNS

[75] Inventors: Thomas B. Fleischer, Raleigh, N.C.; Walter M. Palmer, Greenville, Tenn.

[73] Assignee: Huyck Corporation, Wake Forest, N.C.

[21] Appl. No.: 834,153

[22] Filed: Feb. 27, 1986

Related U.S. Application Data

[63] Continuation of Ser. No. 665,666, Oct. 29, 1984, abandoned.

[51] Int. Cl.[4] .................. B01D 39/08; B32B 5/02; D03D 15/00; D21F 1/10
[52] U.S. Cl. ................ 428/196; 139/383 A; 139/420 A; 428/229; 428/255; 428/258; 428/378; 428/395
[58] Field of Search ............ 162/DIG. 1; 139/383 A, 139/420 A; 428/255, 196, 229, 258, 378, 395

[56] References Cited

U.S. PATENT DOCUMENTS 3,023,441 3/1962 Christie .
3,858,623 1/1975 Lefkowitz .
4,093,512 6/1978 Fleischer .................. 139/420 D
4,202,382 5/1980 Westhead ..................... 428/257
4,259,394 3/1981 Khan ........................... 428/229
4,274,448 6/1981 Westhead .
4,489,125 12/1984 Gognon ....................... 428/235
4,520,059 5/1985 Worrall et al. .............. 428/255
4,533,594 8/1985 Buchanan .................... 428/255

FOREIGN PATENT DOCUMENTS 1310150 10/1962 France .
2106195 4/1972 France .

Primary Examiner—James C. Cannon
Attorney, Agent, or Firm—Lorusso & Loud

[57] ABSTRACT

A papermaker's fabric woven from uniformly pre-coated, totally encapsulated monofilament yarns is disclosed. The yarns are coated prior to the weaving of the papermaker's fabric in order to impart anti-sticking characteristics to the papermaker's fabric. The coatings may be such that thickness of the machine direction yarns is different than the thickness of the cross-machine direction yarns.

11 Claims, 6 Drawing Figures

PAPERMAKERS FABRIC WITH ENCAPSULATED MONOFILAMENT YARNS

This application is a continuation of application Ser. No. 665,666, filed Oct. 29, 1984 and now abandoned.

BACKGROUND OF THE INVENTION

This invention relates to papermaker's fabrics and more particularly to a papermaker's fabric manufactured from monofilament yarns encapsulated with a polymer coating to impart antisticking characteristics to the fabric and also to increase the stability of the fabric.

Forming fabrics for use in papermaking machines usually are in the form of a fine mesh cloth which has been woven endless or otherwise joined into an endless web.

At one time, all forming fabrics were manufactured from metal wires. These metal-wire cloths were useful in all kinds of papermaking machines and for all paper qualities. Eventually, metal-wire cloths were replaced by single-layer cloths or wires of synthetic fiber threads.

The advantage of synthetic threads beyond metal-wire threads primarily resides in their improved fatigue and wear resistance. Single layer synthetic wires or forming fabrics do, however, suffer from the disadvantage of having considerably less stability than paper forming cloths made from metal-wires of corresponding coarseness.

Furthermore, with such forming fabrics formed of synthetic polymer materials it is desirable to provide the polymer yarn surfaces with special surface properties to prevent the adhering of these suspended particles to the fabric which would thereby reduce the drainage properties of the fabric. Adhering of such particles is an acute problem in the case where the liquid suspension, or pulp used to make the paper contains suspended particles of filler clay, pitch (fatty acids) and/or polymer materials from repulped, deinked paper, in addition to suspended cellulose fibers. For example, a non-treated fabric installed on a corrugating machine could lose as much as 20% permeability during its useful life due to particle retention on the fabric.

In the past, the woven fabric was coated or treated, with a coating material such as is disclosed in U.S. Pat. No. 3,032,441 issued to Beaumont and Christie so as to improve characteristics of the fabric. Such a fabric treatment or coating with a film-forming polymer suspension or solution will, however, reduce the drainage capacity of the fabric because coating the entire fabric after it is woven reduces the size of each open area (interstices) on the fabric. Such a fabric treatment with a film-forming polymer suspension or solution will also, especially on high mesh fabrics, have a tendency to form a polymer film window over entire individual interstices, thus completely blocking the drainage through those particular interstices. Such blocked interstices not only reduce the overall drainage capacity of the fabric, but they will also produce quality defects in the paper (pinholes, light spots).

Westhead U.S. Pat. No. 4,274,448 discloses a dryer fabric in which stuffer or filling yarns are encapsulated in bulky fibrous materials such as mineral fibers, natural fibers and synthetic fibers to provide bulk and softness to the finished fabric. Such an encapsulating coating does not prevent suspended particles from adhering to the fabric. Further, Westhead does not teach pre-encapsulating all the yarns which contact the pulp during the paper formation process.

However, if a fabric is manufactured from encapsulated monofilament yarns, according to the present invention, the problem with reduced drainage capacity or blocking of entire interstices cannot occur.

Furthermore, if the encapsulating material has a melting point lower than the heat set temperature of the fabric, the encapsulating material would "weld" the encapsulated yarns in the fabric together at the yarn interlacings, thus producing a fabric with greatly improved stability and firmness.

This welding at the crossovers produced during finishing of a fabric of present invention will have greatly improved resistance to bowing and skewing during operation.

SUMMARY OF THE INVENTION

The papermakers fabric of the present invention is woven from encapsulated or coated monofilament yarns. Prior to weaving the yarns, the yarns are coated with a polymeric material that encapsulates the yarn and prevents the pulp material in the web from sticking to it. The coating is performed either on the extrusion line used for manufacturing the monofilament yarns or as a separate operation after the yarns are manufactured. After the polymeric coating has solidified, these coated polymeric yarns are then used to weave the papermakers fabric. Such fabrics may be used to great advantage as either forming or dryer fabrics.

Encapsulated yarns are used in both the machine direction and the cross-machine direction so that all yarns which contact the pulp have anti-sticking characteristics. However, yarns having a greater thickness of encapsulating film may be employed in the cross-machine direction while yarns having a lesser thickness of encapsulating film may be utilized in the machine direction.

The polymeric coating utilized to encapsulate the yarns used to weave the fabrics of the present invention should be a coating of a low melting polymer so as to enable the coated yarns to be welded together at the yarn cross-overs by simple heat treatment.

A coating medium may be prepared by diluting a film forming aqueous dispersion in water or by dissolving film forming polymers in suitable organic solvents. The yarns may be coated or encapsulated by either causing the uncoated yarns to travel through a coating solution bath or by using a roll applicator. After the yarns are coated with a layer of the coating medium, the liquid in the medium is evaporated leaving the yarn totally encapsulated by a polymer.

With fabrics manufactured from encapsulated monofilament yarns, according to the present invention, the problem of reduced drainage capacity or blocking of entire interstices cannot occur. Furthermore, if the encapsulating material has a melting point lower than the heat set temperature of the fabric, the encapsulating material would "weld" the encapsulate yarns in the fabric together at the yarn interlacings, thus producing a fabric with greatly improved stability and firmness. This welding at the crossovers occurring during finishing of a fabric of the present invention will result in greatly improved resistance to bowing and skewing during use of the fabric. Also, when the belt is woven flat and joined to make a fabric loop, the strength of the join or seam is increased substantially if coated yarns are used and welded by a heat treatment.

It is therefore a principal object of the present invention to provide a papermaker's fabric having improved anti-sticking characteristics and therefore improved working life without appreciable adverse modification of texture and drainage characteristics of the fabric due to contamination.

A further object of the present invention is to provide a papermaker's fabric in which the yarns in the fabric are uniformly encapsulated or coated prior to weaving with an anti-sticking coating so as to avoid the reduction in the drainage capacity of the fabric due to the application of a coating after weaving to result in a papermakers fabric to which the pulp will not stick.

Still another object of the present invention is to provide a fabric with improved resistance to bowing and skewing by welding the encapsulated yarns together at the yarn crossovers.

Yet another object of the present invention is to provide a papermaker's fabric in which the thickness of the encapsulating film on the cross machine direction yarns can be greater than the thickness of the film encapsulating the machine direction yarns to provide a fabric in which the cross machine direction yarns exhibit increased wear resistance.

These and other features and objects of the present invention will be more fully understood from the following detailed description which should be read in light of the accompanying drawings.

DETAILED DESCRIPTION OF THE PREFERRED EMBODIMENT

Figure 1:
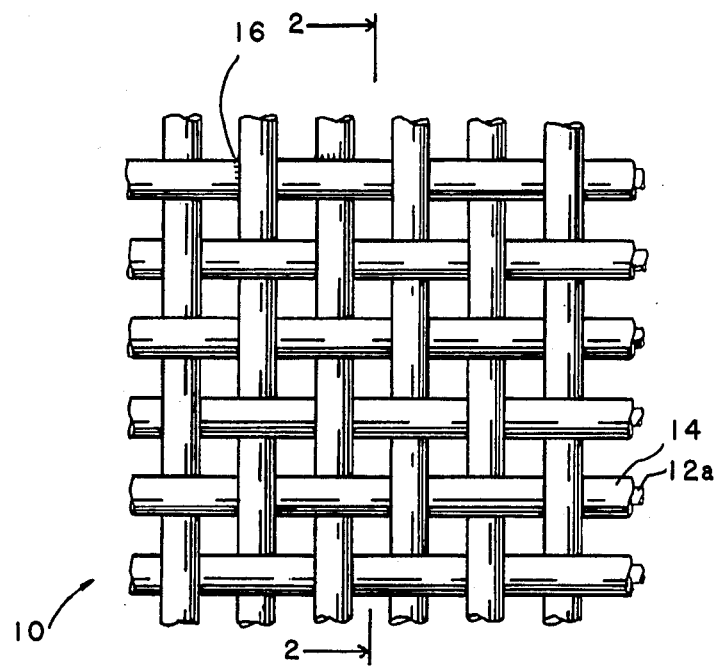
FIG. 1 is a plan view of a section of the papermaker's fabric of the present invention.
Figure 2:
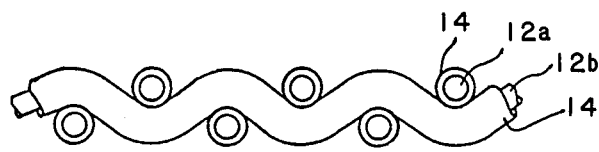
FIG. 2 is a sectional view of the papermaker's fabric of FIG. 1 taken along line 2—2 of FIG. 1.
Figure 3:
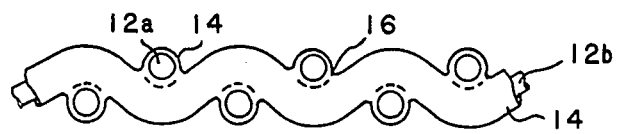
FIG. 3 is a sectional view of the papermaker's fabric of FIG. 1 taken along line 2—2 of FIG. 1 after the fabric has been heat treated.

The papermaker's fabric 10 of the present invention shown in FIGS. 1–3 and 6 includes monofilament yarns 12a and/or 12b encapsulated with a coating 14 of a film-forming polymeric material. Because the yarns 12a and 12b are coated with coating 14 prior to being woven into fabric 10, it is possible for the polymeric material to uniformly coat the yarns of the fabric 10 without reducing the drainage capacity of the fabric.

The papermaker's fabric of the present invention utilizes warp yarns (which are in the cross-machine direction in a fabric woven endless) and filling or weft yarns (which are in the machine direction in an endless weave). In this connection, it should be explained that the term "machine direction" refers to the direction of travel of the sheet being formed on the papermaking machine and hence the direction of travel of the forming fabric. Where a fabric is woven flat and spliced together to form an endless loop, the warp yarns extend in the machine direction and the filling yarns in the cross-machine direction. However, where the fabric is woven endless, the filling yarns extend in the machine direction on the papermaking machine and the warp yarns extend in the cross-machine direction.

Preferably the encapsulating film or coating 14 is formed of a low melting point polymer. Such a polymer allows the monofilament yarns 12a and 12b in the fabric to be welded together at the yarn crossovers 16 (FIG. 3) by heat treatment, and the welding of the yarns enables the fabric 10 to maintain an integral, stable fabric structure. The melting point of the polymer should, however, be high enough to withstand melting in a papermaking environment.

Another aspect of the present invention involves providing a fabric in which the thickness of the encapsulating film 14 on the cross-machine direction yarns 12a is different than the thickness of the film 14 coating the machine direction yarns 12b. The life of a fabric 10 can be increased when the film encapsulating the cross-machine direction yarns 12a has a greater thickness than the film encapsulating the machine direction yarns 12b. The reason for this is that the thicker coating, which is primarily included for its anti-sticking properties, does not wear away due to abrasion.

Figure 5:
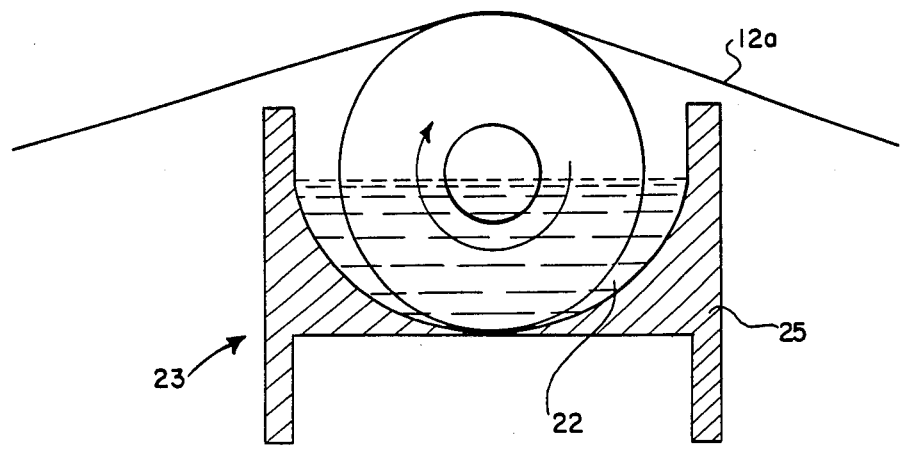
FIG. 5 is a diagrammatic view of a yarn being coated by a roll applicator.
Figure 6:
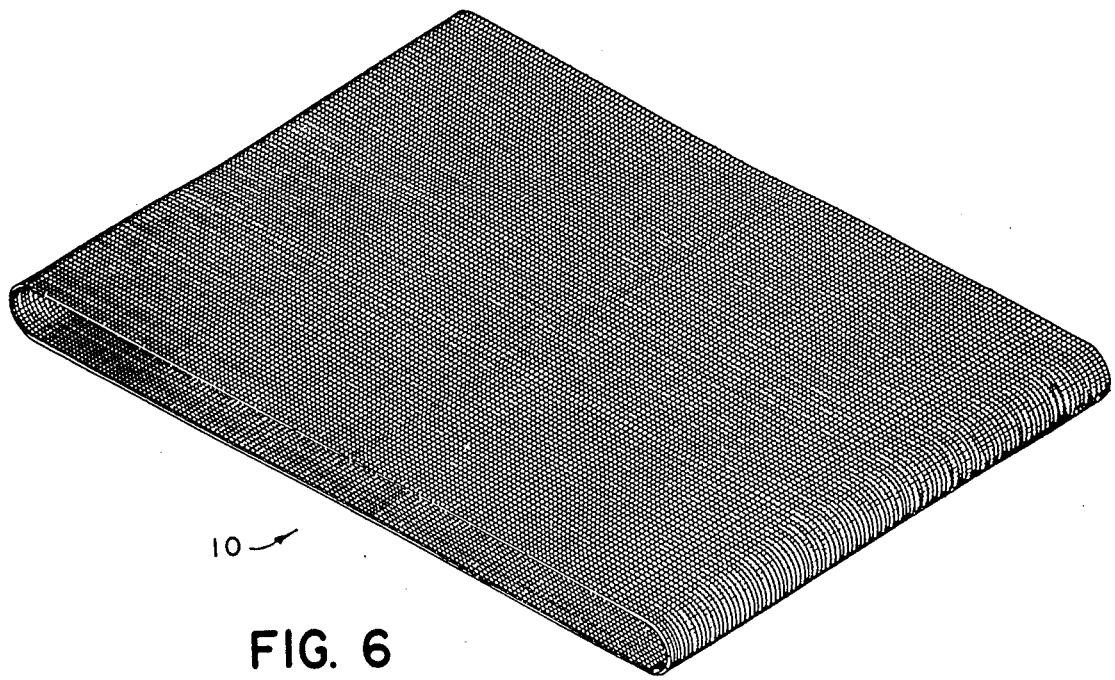
FIG. 6 is a plan view of a forming fabric in the configuration of an endless belt woven from pre-encapsulated yarns.

According to the present invention, it is possible to use both organic and aqueous solvents in the process of encapsulating yarns 12a and 12b without the use of expensive explosion-proof motors and coating and exhaust system required for coating fabrics with polymer-solvent solutions. Further, encapsulation of monofilament yarns can be carried out conveniently directly on the extrusion line used for the manufacture of monofilament yarns. All that is required is the installation of a small yarn coater or liquid applicator. The roll applicator 23 shown in FIG. 5 may be used with only one or two kilograms of coating material 22 in the trough 25 while the fabric coating systems require 100 to 500 kilograms of coating material and involve a substantial waste of expensive chemicals.

Figure 4:
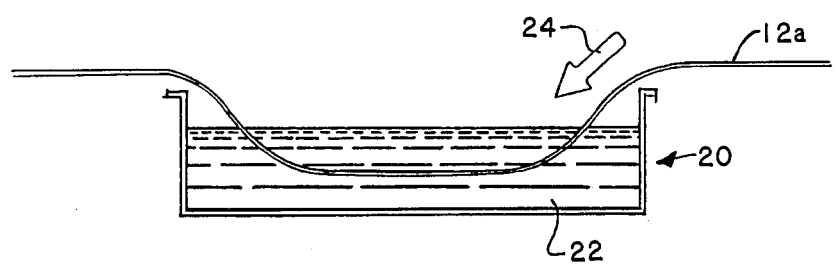
FIG. 4 is a diagrammatic view of a yarn being coated in a bath or trough.

As is shown in FIG. 4, a yarn 12a (or 12b) may also be coated by passing through a bath 20 containing a coating medium 22. The yarn 12a or 12b picks up the coating medium as it travels through the bath in the direction of arrow 24. Evaporation of the solvent of the medium produces a coated yarn.

Numerous tests have shown that the encapsulation of the machine direction or cross machine direction yarns can easily be accomplished by diluting a film forming acqueous dispersion with water or by dissolving film forming polymers in suitable organic solvents to produce a film forming medium. After producing this medium, yarns are coated with it. Next, the liquid in the medium is evaporated leaving the yarn totally encapsulated. The encapsulated yarn is then heat treated at a temperature between 300° to 400° F to improve adhesion of the coating to the yarn substrate. The resulting encapsulated yarn has a coating which ranges from 0.3 to 10% by weight of the monofilament yarn. Yarn diameter may be increased up to 10%.

The invention is further illustrated in the following non-limiting examples. As used throughout this specification and claims all percentages are by weight unless specified otherwise.

EXAMPLES

Example 1

Strands of 0.17 mm diameter polyester monofilament yarn extruded from polyethylene terephthalate chips with an intrinsic viscosity of 0.72 were encapsulated with four different levels of an acqueous dispersion of hydrophilic polyethylene terephthalate polyester resin Milease HPA from I.C.I. America by passing over a roll applicator 23. The coating results are shown below.

| % HPA Solids in Bath | 0 | 3 | 4 | 5 | 7 |
|---|---|---|---|---|---|
| Wet Take-up % on Yarn | 30 | 29 | 27 | 30 | 50 |
| % Resin on Yarn | 0 | 0.9 | 1.1 | 1.5 | 3.5 |
| Moisture Regain at 60% relative humidity (R.H.) | 0.4 | 0.6 | 0.7 | 0.8 | 1.1 |

The yarn sample with 1.1% resin based on yarn weight was woven as cross machine direction yarns in a double layer forming fabric and heat treated under tension at 385° F.

Due to the increased moisture content of the fabric with the encapsulated yarn, it cleaned much easier than a similar fabric with uncoated yarn.

Due to the increased yarn to yarn friction of the encapsulated yarn, the fabric slip strength increased from 44 to 50 kilograms.

Example 2

The yarn of Example 1 was encapsulated with a 4% solution of fluorocarbon resin Milease F-31X from I.C.I. America in a 95/5 by volume solution of acetone/water solvent by passing it over a roll applicator 23.

The yarn was uniformly encapsulated with 1% fluorocarbon resin based on yarn weight and the encapsultaed yarn had excellent resistance to contamination from water based soils.

Example 3

A 0.41 mm diameter polyester monofilament yarn extruded from polyethylene terephthalate chips with an intrinsic viscosity of 0.72 was encapsulated with an aqueous solution of 3% fluorocarbon Zepel RN from DuPont. This encapsulated dryer fabric yarn had 0.5% resin add-on based on the monofil weight. The encapsulated yarn had superior contamination resistance compared to uncoated dryer yarn.

Example 4

The same yarn of Example 3 was encapsulated with an aqueous solution of 4% Silicone Syloft 22 from Dow-Corning to produce a yarn with 1% add-on based on yarn weight.

The contamination resistance of the yarn encapsulated with silicone was superior to untreated yarn of the same size.

Example 5

A 0.19 mm diameter polyester monofilament yarn extruded from polyethylene terephthalate chips with an intrinsic viscosity of 0.72 was encapsulated with a 5% solution of polyethylene terephthalate resin V.P.E. 4709A from Goodyear in 95/5 by volume methylene chloride/methanol solvent, using bath 20. After drying, the encapsulated yarn was woven in the machine direction in a monoplane forming fabric. The fabric was heat treated at 385° F. under tension and tested. The stability of the fabric was increased as the tendency to skew was reduced from 6% to 1% by employing the encapsulated yarn.

As can be seen from the above non-limiting examples, the surface properties of the monofilament yarns are changed when the monofilament yarns are encapsulated in a uniform film of polymeric material.

While the monofilament core yarns utilized in the above examples are extruded from polyethylene terephthalate chips with an intrinsic viscosity of 0.72, other chips having a higher intrinsic viscosity may be used, such as Goodyear's Resin 9504A which has a melting point of 500° F., a specific gravity of 1.39, and an intrinsic viscosity of 0.95.

The foregoing examples are also directed to preferred coating materials. It should be understood, however, that any coating material used to impart anti-sticking characteristics can be used to advantage in the present invention. For example, the monofilament yarns can be coated with a solution of phenolic resin (type F79 supplied by FERS of Barcelona) in isopropanol. The resin is supplied as a liquid phenolic resin containing 70% by weight solids in isopropanol, and this is diluted with further isopropanol to give 3½% by weight resin. The resin is of the phenol-aldehyde (more particularly phenolformaldehyde) kind and is readily soluble even in isopropanol/water mixtures. The yarns are coated by running them through a bath containing the solution. The solutiuon transfers to the yarn due to capillary action, and the yarn is dried by running it past infrared heaters so that the cured resin forms a thin, uniform, coherent film covering all yarn surfaces. The amount of pick up of the resin may be altered by the changing speed at which the yarn is run through the bath.

The range of the coating may be between 0.3 and 10% by weight of the monofilament yarn. Once the yarns are coated, they are then used to weave the papermakers fabric.

The foregoing invention has been described with reference to its preferred embodiments. Although variations and modification will occur to those skilled in the art, it is intended that such variations and modifications fall within the scope of the appended claims.

What is claimed is:

1. A papermaker's forming fabric comprising an endless belt woven from:
   monofilament machine direction yarns precoated prior to weaving with a polymer to impart anti-sticking characteristics to the papermaker's forming fabric and having a uniform, polymeric coating of a first thickness;
   monofilament cross-machine direction yarns precoated prior to weaving a polymer to impart anti-sticking characteristics to the papermaker's forming fabric and having a uniform, polymeric coating of a second thickness, said first and second thicknesses being different.

2. The papermaker's forming fabric of claim 1 wherein said monofilament yarns are completely encapsulated.

3. The papermaker's forming fabric of claim 1 wherein said machine direction yarns and said cross-machine direction yarns are welded together at yarn cross-over points.

4. The papermaker's fabric of claim 1 wherein said polymeric coating has a lower melting point than said monofilament yarns.

5. The papermaker's forming fabric of claim 4 wherein said machine direction and said cross-machine direction yarns are welded together at yarn crossover points by heat treatment.

6. The papermaker's forming of claim 1 wherein said monofilament yarns are extruded from polyethylene terephthalate chips.

7. The papermaker's forming fabric of claim 6 wherein said polyethylene terephthalate chips have an intrinsic viscocity of about 0.72.

8. The papermaker's forming fabric of claim 6 wherein said polyethylene terephthalate chips have an intrinsic visocosity of about 0.95.

9. A papermakers forming fabric comprising an endless belt woven from monofilament yarns uniformly encapsulated prior to weaving with an anti-sticking polymeric coating which the pulp will not stick to, wherein said coating material is a polyester having a lower melting point than the melting point of said monofilament yarns.

10. A method for producing a papermakers forming fabric comprising the steps of:
   producing monofilament yarns;
   uniformly coating said monofilament yarns with a film of polymeric material selected to impart anti-sticking characteristics to the finished forming fabric; and
   weaving the papermakers forming fabric from said coated monofilament yarns, wherein a thickness of said coating on crossmachine direction yarns is different from a thickness of coating on machine direction yarns.

11. A method for producing a papermakers forming fabric comprising the steps of:
   producing monofilament yarns;
   uniformly coating said monofilament yarns with a film of polymeric material selected to impart anti-sticking characteristics to the finished forming fabric; and
   weaving the papermakers forming fabric from said coated monofilament yarns, wherein said polymeric material is a polyester having a low melting point compared to the melting point of said monofilament yarns.

* * * * *

UNITED STATES PATENT AND TRADEMARK OFFICE
CERTIFICATE OF CORRECTION

PATENT NO. : 4,731,281

DATED : March 15, 1988

INVENTOR(S) : Fleischer et al

It is certified that error appears in the above-identified patent and that said Letters Patent is hereby corrected as shown below:

column 6, line 47: "and" should be inserted after "thickness";

column 6, line 49: "with" should be inserted after "weaving"; and column 6, lines 52-53: "first and second thicknesses being different" should be deleted and in place thereof "second thickness being greater than said first thickness, wherein said cross-machine direction yarns exhibit increased wear resistance so that the anti-sticking coating does not prematurely wear away due to abrasion" should be inserted.

Signed and Sealed this

Thirteenth Day of December, 1988

Attest:

DONALD J. QUIGG

*Attesting Officer*   *Commissioner of Patents and Trademarks*